(12) United States Patent
Sloman

(10) Patent No.: US 6,350,115 B1
(45) Date of Patent: Feb. 26, 2002

(54) PRESSURE TRANSMITTERS FOR USE IN THE PRODUCTION OF COMPOSITE COMPONENTS

(75) Inventor: Roger Mark Sloman, Ilkeston (GB)

(73) Assignee: Advanced Composites Group Ltd., Derbyshire (GB)

( * ) Notice: Subject to any disclaimer, the term of this patent is extended or adjusted under 35 U.S.C. 154(b) by 0 days.

(21) Appl. No.: 09/202,970
(22) PCT Filed: Apr. 30, 1998
(86) PCT No.: PCT/GB98/01270
 § 371 Date: Dec. 23, 1998
 § 102(e) Date: Dec. 23, 1998
(87) PCT Pub. No.: WO98/50214
 PCT Pub. Date: Nov. 12, 1998

(30) Foreign Application Priority Data

May 3, 1997 (GB) .............................. 9709011

(51) Int. Cl.⁷ .............................. B32B 3/00; B29C 41/12
(52) U.S. Cl. .............................. 425/389; 425/DIG. 44; 264/225; 264/257; 428/368
(58) Field of Search .............................. 425/389, 405.1, 425/DIG. 44; 264/225, 257, 313, 316, 571; 156/285, 382; 428/368, 378, 375, 394; 442/187, 286

(56) References Cited

U.S. PATENT DOCUMENTS

| | | | | |
|---|---|---|---|---|
| 3,622,412 A | * | 11/1971 | Ross .............................. | 156/87 |
| 3,962,511 A | * | 6/1976 | Foti .............................. | 428/246 |
| 3,990,930 A | | 11/1976 | Schmit | |
| 4,086,378 A | * | 4/1978 | Kam et al. .............................. | 264/257 |
| 4,770,928 A | | 9/1988 | Gaworowski et al. | |
| 4,824,631 A | | 4/1989 | Yeager | |
| 4,842,670 A | * | 6/1989 | Callis et al. .............................. | 156/382 |
| 5,131,834 A | * | 7/1992 | Potter .............................. | 425/389 |
| 5,190,773 A | * | 3/1993 | Damon .............................. | 425/186 |
| 5,225,140 A | * | 7/1993 | Hayashikoshi et al. .............................. | 264/571 |
| 5,324,376 A | | 6/1994 | Weimer et al. | |
| 5,439,635 A | * | 8/1995 | Seemann .............................. | 425/389 |
| 5,451,256 A | * | 9/1995 | Morton .............................. | 118/59 |
| 5,714,179 A | * | 2/1998 | Goodridge et al. .............................. | 425/394 |
| 5,786,285 A | * | 7/1998 | Walla et al. .............................. | 442/397 |
| 5,897,739 A | * | 4/1999 | Forster et al. .............................. | 156/285 |

FOREIGN PATENT DOCUMENTS

| | | |
|---|---|---|
| EP | 0 318 415 A2 | 5/1989 |
| EP | 0 491 646 A2 | 6/1992 |
| EP | 0 491 651 A1 | 6/1992 |
| EP | 0 572 248 A1 | 12/1993 |
| GB | 2 290 742 A | 1/1996 |

* cited by examiner

Primary Examiner—Nam Nguyen
Assistant Examiner—Thu Khanh T. Nguyen
(74) Attorney, Agent, or Firm—Adams, Schwartz & Evans, P.A.

(57) ABSTRACT

A pressure transmitter for use in the curing of composite components may take the form of a caul plate, pressure intensifier or vacuum bag and is formed from a curable elastomeric material which is partially cured, normally when supported on a mold, at a temperature not exceeding 100° C. It is subsequently further cured at, for example 175° C., while unsupported. It may incorporate a reinforcing layer formed from a curable resin pre-impregnated fibrous material.

2 Claims, 2 Drawing Sheets

PRESSURE TRANSMITTERS FOR USE IN THE PRODUCTION OF COMPOSITE COMPONENTS

This application is a national stage application, according to Chapter I of the Patent Cooperation Treaty.

This invention relates to pressure transmitters for use in the production of composite components. The term "pressure transmitter" as used herein is intended to refer to cover members and ancillaries used to allow pressure to be applied to composite components during their moulding in a tool. The expression includes caul plates, pressure intensifiers and reusable rubber bags.

The use of caul plates, pressure intensifiers and rubber bags to produce smooth surfaces on composite components is a normal practice. Caul plates and/or pressure intensifiers can be made from an elastomeric material and enable appropriate pressure to be applied to the laminate in order to provide a relatively smooth surface on the bag side. In the case of pressure intensifiers, these are mainly used in female features on the non moulded side of the component. The caul plates consist of an elastomeric sheet which may be reinforced by a resin pre-impregnated fibre. The disadvantage of these caul plates made from fully formulated sheet rubber is that they require to be cured at high temperatures (greater than 100° C.). Also, some reinforced caul plates exhibit the disadvantage that the elastomeric material tends to separate from the fibre reinforcement, and others may give undesirable contamination problems.

As used herein, the expression "partially cured" when referring to a curable component means cured to the extent that the component can be removed from a mould, tool or former (which may or may not have high temperature capability (ie being capable of withstanding temperatures of greater than 100° C.)), and then be handled and further processed (including a higher temperature further curing stage) without causing damage to the component. Further the expression "elastomeric material" includes the precursors of such materials, for example, fully formulated polymeric materials which after partial or full cure exhibit elastomeric properties. The polymeric material may be in sheet form.

According to a first aspect of the present invention there is provided a pressure transmitter comprising an elastomeric material which is partially or at least partially cured at a temperature not exceeding 100° C.

According to a second aspect of this invention, there is provided a pressure transmitter for use in the production of composite components, the pressure transmitter comprising an inner region of a reinforcement and an outer region of an elastomeric material, the elastomeric material being partially or, at least partially, curable at a temperature not exceeding 100° C.

Preferably, the elastomeric material is partially or, at least partially, curable at 20–70° C., preferably 65° C. Conveniently the elastomeric material is partially cured during a period of 14 hours.

Desirably, the elastomeric material is further cured at an elevated temperature to reach a state of being substantially fully cured. Preferably the elevated temperature lies in the range 170–185° C. Preferably, the elastomeric material can be further cured at a temperature of substantially 175° C. Conveniently the elastomeric material is further cured for a period of at least 2 hours.

Preferably elastomeric material is a silicone elastomer, an acrylate or a fluoroelastomer.

According to a further aspect of this invention, there is provided a pressure transmitter for use in the production of composite components, the pressure transmitter comprising an inner region of a curable reinforcement and an outer region of elastomeric material, the curable reinforcement comprising resin pre-impregnated onto fibres, said resin being partially, or at least partially, curable at 100° C. or less.

Preferably the elastomeric material cures or at least partially cures at a temperature greater than the cure or partial cure temperature of the curable reinforcement. This provides the advantage that the resin cures or partially cures before the elastomer, thereby reducing shrinkage of the elastomer.

Preferably, the elastomeric material is partially, or at least partially, cured at a temperature in the range of 20–70° C. more preferably at 65° C. Preferably, the elastomeric material is partially cured during a period of 14 hours.

Desirably the elastomeric material is further cured to reach a state of full cure at a temperature in the range of 170–185° C. Preferably, the elastomeric material can be further cured at a temperature of substantially 175° C. Conveniently the elastomeric material is further cured during a period of 2 hours.

According to a still further aspect of this invention, there is provided a pressure transmitter for use in the production of composite components, the pressure transmitter comprising an inner region of a curable prepreg reinforcement and an outer region of an elastomeric material, the curable prepreg reinforcement being in the for m of resin pre-impregnated fibres defining a plurality of interstitial spaces, wherein the elastomeric material of the outer region substantially fills the interstitial spaces.

This has the advantage that the elastomer is keyed to the fibres, thereby mitigating any separation of the resin pre-impregnated fibres from the elastomer.

Preferably, the pressure transmitter is in the form of a caul plate, or a pressure intensifier for use in applying pressure to surfaces of a moulded component. The invention is particularly suitable for use with moulding techniques which involve the use of a bag applied to the moulding, for example by using vacuum bags.

According to another aspect of this invention, there is provided a method of curing a pressure transmitter, comprising providing a pressure transmitter as described above, and thereafter at least partially curing the pressure transmitter at a temperature not exceeding 100° C.

The pressure transmitter may be partially or, at least partially, cured at a temperature in the range of 60–70° C. (approximately 140–160° F.), more preferably at 65° C. (approximately 150° F.). Conveniently, the pressure transmitter is partially cured during a period of at least substantially 14 hours. The pressure transmitter may be partially cured within 14 hours.

Desirably, after said partial or, at least partial, curing, the pressure transmitter is further cured at a temperature in the range of 170–185° C. (approximately 340–365° F.). Preferably, the pressure transmitter is further cured at a temperature of substantially 175° C. (approximately 350° F.). The pressure transmitter may be so further cured during a period of at least substantially 2 hours. The pressure transmitter may be so further cured within 2 hours.

The elastomeric material may be a silicone elastomer.

By appropriate selection of the resin and elastomeric material, the low temperature curing of the pressure transmitter will result in the resin curing or, partially curing, before the elastomer has fully cured. This has the advantage of minimising shrinkage of the elastomer. Another advantage of the low temperature curing (ie less than 100° C.) is that it can take place on a tool that can only withstand such low temperatures. The step of further curing the pressure transmitter provides the elastomeric material with the properties to enable the pressure transmitter to perform its function.

BRIEF DESCRIPTION OF THE DRAWING

An embodiment of the invention will now be described by way of example only with reference to the accompanying drawings in which:

Referring to FIG. 1, there is shown a prepreg lay-up 10 to be used in forming a composite component. The prepreg lay-up is arranged on a tool 12 with a caul plate 14 placed on the lay-up 10. The caul plate 14 comprises an inner region 16 of a fibre reinforcement and an outer region 18A, 18B of an elastomeric material 18. In the formation of the composite component, a vacuum bag or sheet 19 is arranged over the lay-up 10 and the caul plate 14. Air is removed from the vacuum bag 19 whereby air pressure provides the necessary pressure for moulding and heat is also applied, in the standard way.

Figure 3:
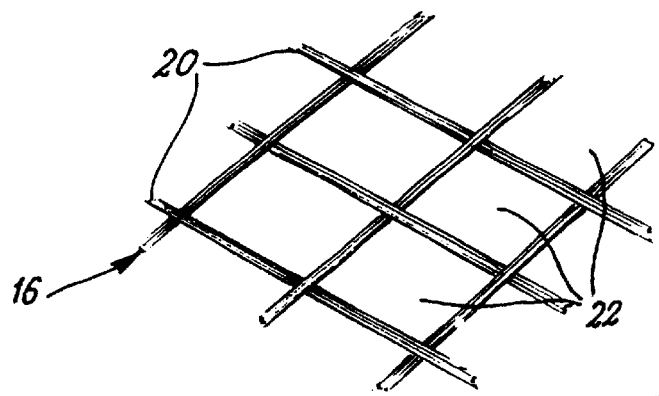
FIG. 3 shows a reinforcement not to scale with resin pre-impregnated fibres defining interstitial spaces.
Figure 4:
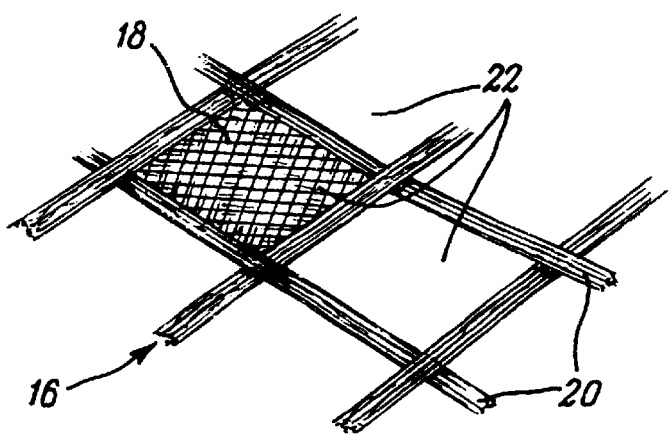
FIG. 4 is a view similar to FIG. 3 but showing an elastomer in the interstitial spaces.

The fibre reinforcement 16 comprises woven fibres 20 defining a net like structure having interstitial spaces 22 (see FIG. 3). The interstitial spaces 22 are, as shown in FIG. 4, filled with the elastomeric material 18 defining outer regions 18A, 18B. The reinforcement 16 may be formed of one or a plurality of layers of the woven fibres 20.

The caul plate 14 is first processed to make it usable as described in the preceding two paragraphs by partially curing the caul plate 14 at a temperature of less than substantially 65° C. at least 14 hours during a first curing stage the caul plate being supported on a mould which need not be capable of withstanding high temperatures (eg above 100° C.) during the process. This first curing stage partially or fully cures the resin and partially cures the elastomeric material 18. This minimises the shrinkage of the elastomeric material 18. After the first curing stage, the caul plate 14 is then further cured during a second curing stage for at least 2 hours at a temperature of substantially 175° C. to fully cure the resin and the elastomeric material such that the caul plate 14 develops the appropriate properties normally expected of a caul plate 14 (see below). This second stage does not necessarily require the use of a mould to support the caul plate.

Thus, the resin and elastomeric material are selected to be capable of partial curing at low temperature ie less than 100° C.

Figure 1:
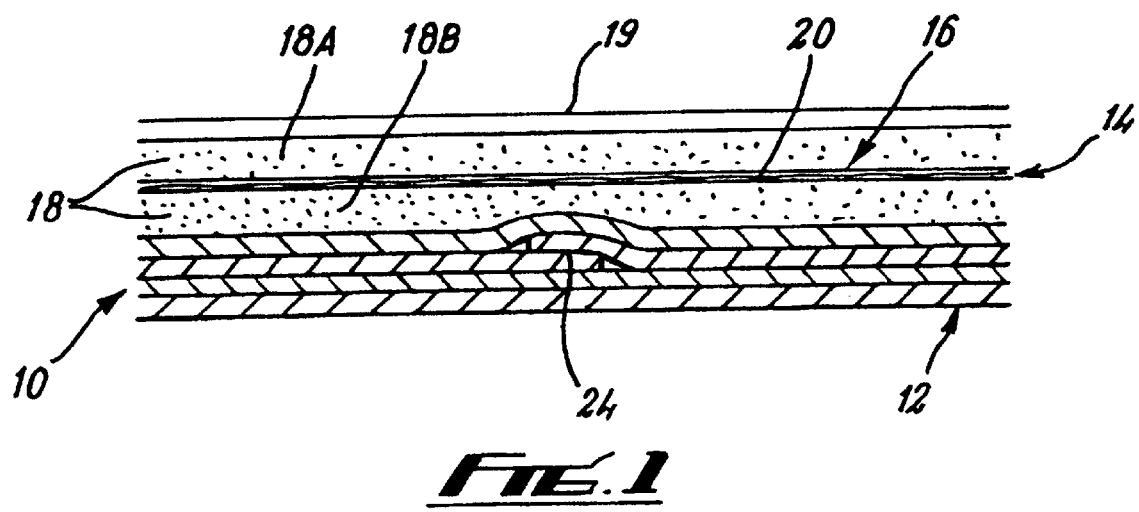
FIG. 1 shows a schematic diagram pressure transmitter in the form of a caul plate in use.

As can be seen at FIG. 1 a wrinkle 24 in the prepreg lay-up 10 can be formed where adjacent plies overlap and at other places. The use of a caul plate 14 assists in smoothing out or preventing the formation of such wrinkles 24.

The caul plate may have a microporous membrane arranged on its side adjacent the lay-up 10 to facilitate removal of gases emitted by the resin during the curing process. Alternatively a solid impermeable sheet for example of HALAR could be substituted for the microporous membrane. The sheet may be in the form of a film bonded to the caul plate.

Figure 2:
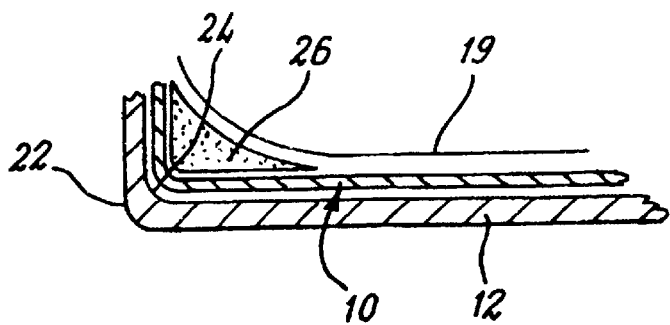
FIG. 2 shows a schematic diagram of a pressure transmitter in the form of a pressure intensifier in use.

Referring to FIG. 2, there is shown a tool 12 at a corner region 22 thereof where the prepreg lay-up 10 defines a concave region 24. A pressure intensifier 26 is arranged in the concave region 24 to ensure that appropriate pressure is applied thereto.

The pressure intensifier 26 is formed in a similar manner to the caul plate described above using similar cure and postcure temperatures.

In a modification the reinforcement may be omitted from the caul plate or from the pressure intensifier. In the modification, the caul plate and pressure intensifier are manufactured in the manner described above, that is they are partially cured at a temperature not exceeding 100° C. on a mould which need not be capable of withstanding temperatures of greater than 100° C. so that it can be manufactured, for example, from wood, plaster or other suitable easily worked material but after the initial cure stage the caul plate and pressure intensifier is removed from the mould for further curing to a fully or approaching fully cured state at an elevated temperature for example 175° C. As before the initial cure time can be 14 hours and the postcure time 2 hours.

In a further modification of the present invention the pressure transmitter may take the form of a vacuum bag, that is a bag formed, in the simplest example, from two sheets of elastomeric material, sealed or sealable around the periphery of the sheets to form a bag which, after fitting with normal backing connections etc. be used in a vacuum bag moulding process. In this modification, as before, the vacuum bag is formed from two sheets of fully formulated polymeric material which are made into the bag when the material is in an uncured state (examples of suitable material being set out below). The bag can be cured during the initial cure stage which is carried out, for example for 14 hours, at temperatures no greater than 100° C. and typically 65° C., thereafter, as appropriate, the bag can be fully cured bearing, for example, a further 2 hour cure cycle at an elevated temperature for example 175° C. Standard vacuum bag fitments for example vacuum terminals, openable seals etc. can be fitted before the initial cure or if convenient before the postcure, that is after the initial cure.

Examples of the properties of suitable elastomeric materials 18 are set out below.

EXAMPLE 1

| Physical Properties | |
| --- | --- |
| Form: | soft and conformable with the slightest degree of tack. |
| Color: | royal blue |
| Thickness: | 0.060", (60 mils), other thickness will be available. |
| Width: | up to 50", calendered rolls. |
| Cured Properties | |
| Durometer | 70 (nominal) |
| Tensile Strength | 1000+ (psi) |
| Elongation at Break | 350+ (%) |
| Modulus at 100% | 505 (psi) |
| Modulus at 300% | 940 (psi) |
| Tear Strength | 160+ (ppi) |
| Compression Set | 30 (%) (22 hours at 350° F.) |
| Adhesion | excellent (cocured to LTM prepreg) |
| Temperature Resistance | 450° F. to 500° F. (when fully cured) |

EXAMPLE 2

| Physical Properties | |
|---|---|
| Form: | soft and conformable with the slightest degree of tack. |
| Color: | clear |
| Thickness: | 0.085", (85 mils), other thickness will be available. |
| Width: | up to 50", calendered rolls. |
| Cured Properties | |
| Durometer | 40 (nominal) |
| Tensile Strength | 1510+ (psi) |
| Elongation at Break | 925+ (%) |
| Modulus at 100% | 300 (psi) |
| Modulus at 300% | 300 (psi) |
| Tear Strength | 150+ (ppi) |
| Compression Set | TBD |
| Temperature Resistance | 450° F. to 500° F. (when fully cured) |

Various modifications can be made without departing from the scope of the invention.

What is claimed is:

1. A pressure transmitter for use in the production of composite components, the pressure transmitter comprising an inner region of a curable prepreg reinforcement in the form of resin pre-impregnated fibers defining a plurality of interstitial spaces and an outer region of an elastomeric material which enters into the interstitial spaces, the resin of the prepreg reinforcement being partially curable at a temperature not exceeding 100° C. and subsequently further cured at a temperature of at least 170° C.

2. A method of manufacturing a pressure transmitter for use in the production of composite components comprising providing an inner region of a curable prepreg reinforcement and an outer region of elastomeric material, the curable prepreg reinforcement being in the form of resin pre-impregnated fibers defining a plurality of interstitial spaces and the elastomeric material of the outer region covering said prepreg and entering into the interstitial spaces, supporting the transmitter on a mold during initial partial curing of the prepreg reinforcement and the elastomeric material at a temperature not exceeding 100° C., removing the transmitter from the mold and further curing the prepreg reinforcement and elastomeric material while substantially unsupported at a temperature of at least 170° C.

* * * * *